United States Patent
Shukunami et al.

(10) Patent No.: US 9,438,343 B2
(45) Date of Patent: Sep. 6, 2016

(54) TRANSMITTING DEVICE, COMMUNICATION SYSTEM, AND METHOD FOR TRANSMISSION LEVEL CONTROL

(71) Applicant: FUJITSU LIMITED, Kawasaki-shi, Kanagawa (JP)

(72) Inventors: Norifumi Shukunami, Yokohama (JP); Kosuke Komaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 13/954,024

(22) Filed: Jul. 30, 2013

(65) Prior Publication Data

US 2014/0079385 A1 Mar. 20, 2014

(30) Foreign Application Priority Data

Sep. 18, 2012 (JP) .................................. 2012-204862

(51) Int. Cl.
| | |
|---|---|
| H04B 10/08 | (2006.01) |
| H04B 17/00 | (2015.01) |
| H04J 14/06 | (2006.01) |
| H04B 10/12 | (2006.01) |
| H01S 3/00 | (2006.01) |
| H04B 10/25 | (2013.01) |
| H04B 10/077 | (2013.01) |
| H04B 10/079 | (2013.01) |
| H04B 10/564 | (2013.01) |

(Continued)

(52) U.S. Cl.
CPC ...... *H04B 10/2504* (2013.01); *H04B 10/0775* (2013.01); *H04B 10/07955* (2013.01); *H04B 10/564* (2013.01); *H04J 14/0221* (2013.01); *H04J 14/0275* (2013.01); *H04B 10/1121* (2013.01)

(58) Field of Classification Search
CPC .................... H04B 10/0775; H04B 10/07955; H04B 10/2504; H04B 10/1121; H04B 10/1125; H04B 10/1127; H04B 10/25753; H04B 10/25758; H04B 10/25759
USPC .................... 398/16, 32, 25, 34, 37, 65, 141
See application file for complete search history.

(56) References Cited

U.S. PATENT DOCUMENTS

| | | | | |
|---|---|---|---|---|
| 5,596,667 A | * | 1/1997 | Watanabe ............. | G02F 1/3538 372/21 |
| 5,801,858 A | * | 9/1998 | Roberts ................ | H04B 10/032 359/349 |

(Continued)

FOREIGN PATENT DOCUMENTS

| | | |
|---|---|---|
| JP | 5-30030 | 2/1993 |
| JP | 8-251103 | 9/1996 |

(Continued)

OTHER PUBLICATIONS

Japanese Office Action dated Mar. 8, 2016 in corresponding Japanese Patent Application No. 2012-204862, 4 pages.

*Primary Examiner* — Ken N Vanderpuye
*Assistant Examiner* — Abbas H Alagheband
(74) *Attorney, Agent, or Firm* — Staas & Halsey LLP

(57) ABSTRACT

A transmitting device includes a transmitter configured to transmit signal light to an external receiver over a medium included in a transmission line; and a controller configured to control a transmission level of the signal light in accordance with a reception level of probe light which is input from the receiver over the medium in the transmission line.

16 Claims, 4 Drawing Sheets

(51) Int. Cl.
*H04J 14/02* (2006.01)
*H04B 10/112* (2013.01)

(56) References Cited

U.S. PATENT DOCUMENTS

| | | | | |
|---|---|---|---|---|
| 5,894,362 A * | 4/1999 | Onaka | H04B 10/077 | 398/34 |
| 5,923,453 A * | 7/1999 | Yoneyama | H04B 10/077 | 398/167 |
| 6,271,945 B1 * | 8/2001 | Terahara | H04B 10/505 | 398/26 |
| 6,333,805 B1 * | 12/2001 | Kamata | G01J 1/26 | 250/205 |
| 6,599,039 B1 * | 7/2003 | Nakazato | H04B 10/077 | 398/25 |
| 6,738,584 B1 * | 5/2004 | Tsuda | H04B 10/11 | 385/123 |
| 6,765,659 B1 * | 7/2004 | Bhatnagar | G01M 11/338 | 356/73.1 |
| 6,819,875 B2 * | 11/2004 | Touma | H04B 10/506 | 359/337 |
| 7,046,930 B2 * | 5/2006 | Kawarai | H04B 10/077 | 398/27 |
| 7,242,864 B2 * | 7/2007 | Muzicant | H04B 10/0771 | 398/160 |
| 7,437,069 B2 * | 10/2008 | Deguchi | H04B 10/03 | 398/15 |
| 7,551,828 B2 * | 6/2009 | Shimada | H04B 10/564 | 385/140 |
| 7,627,244 B2 * | 12/2009 | Fujita | H04B 10/077 | 398/10 |
| 7,756,416 B2 * | 7/2010 | Tomofuji | H04J 14/0227 | 398/2 |
| 7,756,422 B2 * | 7/2010 | Sakamoto | H04B 10/07 | 398/177 |
| 7,899,331 B2 * | 3/2011 | Itoh | H04J 14/0221 | 359/337.1 |
| 7,917,030 B2 * | 3/2011 | BuAbbud | H04B 10/0771 | 398/15 |
| 8,373,926 B2 * | 2/2013 | Frankel | H04J 14/0221 | 359/341.4 |
| 8,554,088 B2 * | 10/2013 | Goto | H04B 10/0797 | 398/197 |
| 8,625,996 B2 * | 1/2014 | Tanaka | H04B 10/2557 | 398/159 |
| 2002/0024690 A1 * | 2/2002 | Iwaki | H04B 10/03 | 398/13 |
| 2002/0178417 A1 * | 11/2002 | Jacob | H04J 14/02 | 714/752 |
| 2002/0196506 A1 * | 12/2002 | Graves | H04B 10/1125 | 398/126 |
| 2003/0035171 A1 * | 2/2003 | Touma | H04B 10/506 | 398/79 |
| 2003/0081295 A1 * | 5/2003 | Kamura | H04B 10/0777 | 398/181 |
| 2003/0099032 A1 * | 5/2003 | Asao | H01S 3/06754 | 359/341.4 |
| 2003/0223745 A1 * | 12/2003 | Tomofuji | H04J 14/0227 | 398/9 |
| 2004/0047628 A1 * | 3/2004 | Passier | H04B 10/077 | 398/15 |
| 2004/0109694 A1 * | 6/2004 | Suzuki | H04B 10/2931 | 398/177 |
| 2004/0213567 A1 * | 10/2004 | Deguchi | H04B 10/03 | 398/32 |
| 2004/0247314 A1 * | 12/2004 | Kawarai | H04B 10/077 | 398/27 |
| 2005/0100344 A1 * | 5/2005 | Hogan | H04J 14/02 | 398/183 |
| 2005/0220454 A1 * | 10/2005 | Okuno | H04B 10/0771 | 398/30 |
| 2005/0244161 A1 * | 11/2005 | Satoh | H04J 14/0227 | 398/85 |
| 2006/0018658 A1 * | 1/2006 | Mori | H04J 14/0221 | 398/79 |
| 2006/0139742 A1 * | 6/2006 | Frankel | H04J 14/0221 | 359/341.4 |
| 2006/0221435 A1 * | 10/2006 | Maeda | H04B 10/296 | 359/337 |
| 2006/0222367 A1 * | 10/2006 | Onaka | H04B 10/296 | 398/83 |
| 2006/0269284 A1 * | 11/2006 | Fujita | H04B 10/077 | 398/38 |
| 2007/0053650 A1 * | 3/2007 | Shimada | H04J 14/0221 | 385/140 |
| 2007/0086332 A1 * | 4/2007 | Way | H04J 3/14 | 370/223 |
| 2007/0217794 A1 * | 9/2007 | Sakamoto | H04B 10/07 | 398/177 |
| 2008/0080867 A1 * | 4/2008 | Itoh | H04J 14/0221 | 398/97 |
| 2009/0142061 A1 * | 6/2009 | BuAbbud | H04B 10/0771 | 398/79 |
| 2009/0324257 A1 * | 12/2009 | Murakami | H04J 14/0221 | 398/200 |
| 2010/0104276 A1 * | 4/2010 | Komaki | H04B 10/0775 | 398/17 |
| 2010/0134875 A1 * | 6/2010 | Mori | H04B 10/2935 | 359/334 |
| 2010/0322633 A1 * | 12/2010 | Suzuki | H04B 10/2942 | 398/93 |
| 2011/0058821 A1 * | 3/2011 | Goto | H04B 10/0797 | 398/195 |
| 2013/0148192 A1 * | 6/2013 | Frankel | H04J 14/0221 | 359/341.41 |

FOREIGN PATENT DOCUMENTS

JP 9-116504 5/1997
JP 11-74838 3/1999

* cited by examiner

TRANSMITTING DEVICE, COMMUNICATION SYSTEM, AND METHOD FOR TRANSMISSION LEVEL CONTROL

CROSS-REFERENCE TO RELATED APPLICATION

This application is based upon and claims the benefit of priority of the prior Japanese Patent Application No. 2012-204862, filed on Sep. 18, 2012, the entire contents of which are incorporated herein by reference.

FIELD

The embodiment discussed herein is related to a transmitting device, a communication system, and a method for transmission level control.

BACKGROUND

Along with increased demand for communications, optical networks utilizing wavelength division multiplexing (WDM) techniques are widely deployed. WDM is a technology for multiplexing and transmitting a number of optical signals having different wavelengths.

A wavelength multiplexing transmission apparatus adopting the WDM technology has optical transceivers, known as transponders, for respective lines, and multiple optical signals are input and output via the optical transceivers. The wavelength multiplexing transmission apparatus transmits a wavelength-multiplexed optical signal generated by multiplexing optical signals input from optical transceivers to another apparatus, and splits a wavelength-multiplexed optical signal received from another apparatus into optical signals of given wavelengths and outputs them from the optical transceivers, for example.

The wavelength multiplexing transmission apparatus also includes an amplifier for amplifying outgoing and incoming wavelength-multiplexed optical signals. Thus, the reception level of a wavelength-multiplexed optical signal has to be within the dynamic range (the range in which light reception is possible) of the amplifier for avoidance of reception errors. Since the reception level varies with variations in transmission line loss caused such as by change in temperature and change in the laying condition of optical fiber (change in radius of curvature, for example), the wavelength multiplexing transmission apparatus controls the transmission level of wavelength-multiplexed optical signals so as to compensate for (or reduce) variations in transmission line loss.

In relation to transmission level control, Japanese Laid-open Patent Publication No. 5-030030 discloses a technique for detecting transmission line loss from the difference between the light output power of the transmitter of a bi-directional transmission apparatus and the received power of the receiver and adjusting the light output power, for example. Japanese Laid-open Patent Publication No. 9-116504 discloses a technique for branching an optical multiplexed signal received from an optical transmission terminal on a first transmission line, sending back the resulting signals to the optical transmission terminal on a second transmission line, and controlling light output power based on the result of measuring wavelength characteristics derived from the optical power of the signal light of each wavelength.

Japanese Laid-open Patent Publication No. 8-251103 discloses a technique for an optical transmitter to decide the state of connection of a connector that connects the optical transmitter with a transmission line based on whether a pilot signal is received from the transmission line or not and output optical signals to the transmission line only when the connector is connected.

A wavelength multiplexing transmission apparatus sends a wavelength-multiplexed optical signal to another apparatus on one of a pair of transmission lines and receives the value of reception level of the wavelength-multiplexed optical signal on the other transmission line from the other apparatus. The wavelength multiplexing transmission apparatus then calculates transmission line loss from the difference between the transmission level and reception level of the wavelength-multiplexed optical signal, and controls the transmission level so as to compensate for (or reduce) variations in transmission line loss.

The transmission level of a wavelength-multiplexed optical signal varies with the number of optical signals that are input from optical transceivers (the number of wavelengths corresponding to such optical signals, for example). When a change occurs in transmission level, it is recognized as a temporary variation in transmission line loss because the reception level used for calculation of transmission line loss has not reflected the change in transmission level due to transmission line delay. The wavelength multiplexing transmission apparatus therefore delays control of transmission level so that a calculated transmission line loss is not reflected into transmission level until the reception level value is updated.

This control method, however, is disadvantageous in that when transmission line loss significantly varies within a short period of time, the transmission level is not able to keep up with the variation due to the delay mentioned above, resulting in a reception error on the receiving-end apparatus.

SUMMARY

According to an aspect of the embodiment, a transmitting device includes a transmitter configured to transmit signal light to an external receiver over a medium included in a transmission line; and a controller configured to control a transmission level of the signal light in accordance with a reception level of probe light which is input from the receiver over the medium in the transmission line.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
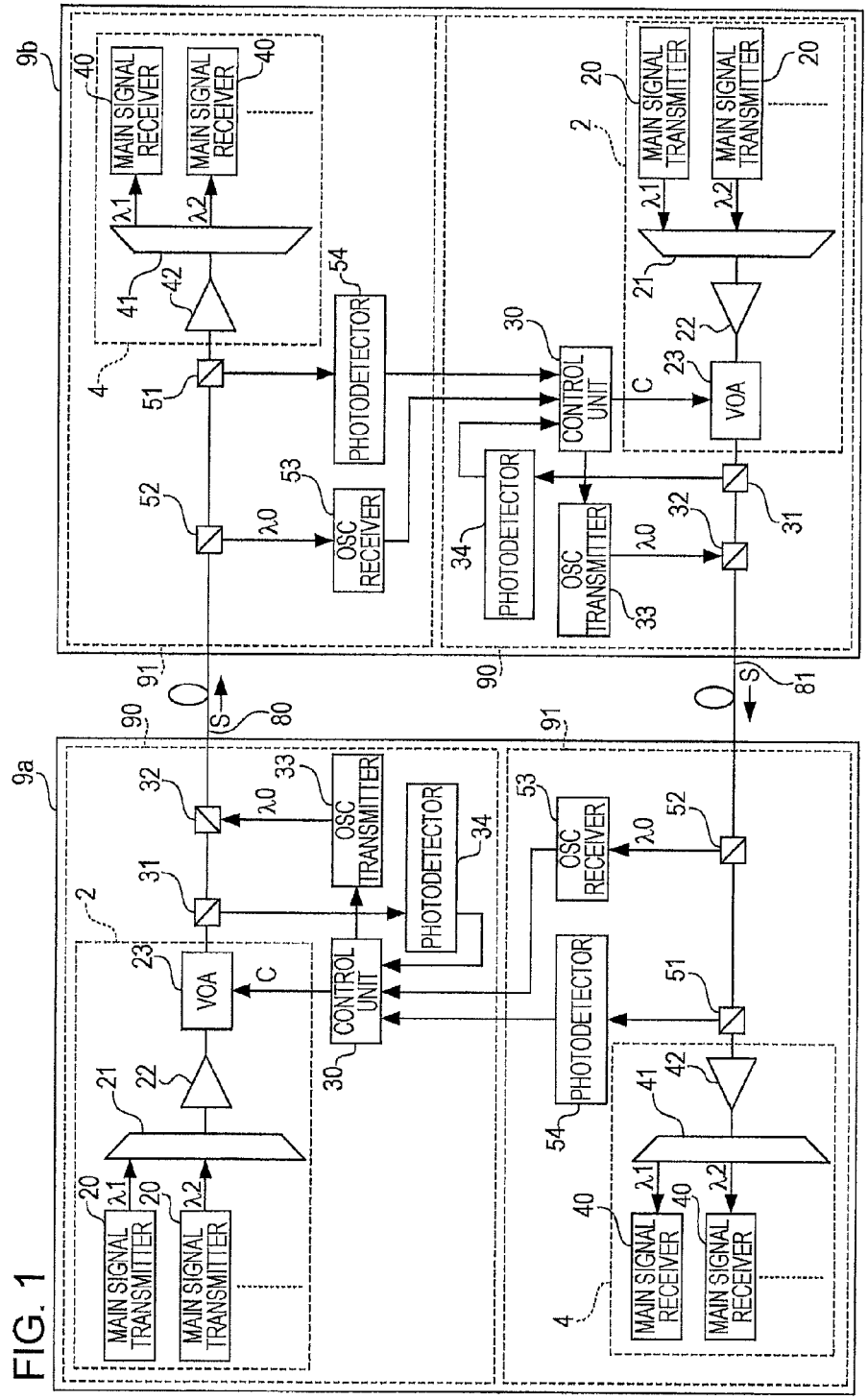
FIG. 1 illustrates a configuration of a communication system as a comparative example.

FIG. 1 illustrates a configuration of a communication system as a comparative example. The communication system includes a set of transmission apparatuses 9a and 9b, which each include a transmitting device 90 and a receiving device 91. The transmitting device 90 and the receiving device 91 of one transmission apparatus 9a are respectively connected with the receiving device 91 and the transmitting device 90 of the other transmission apparatus 9b via separate transmission lines 80 and 81, which are optical fibers. The configurations of the transmitting device 90 and receiving device 91 are common to the transmission apparatuses 9a and 9b.

The transmission apparatuses 9a and 9b are wavelength multiplexing transmission apparatuses that multiplex and transmit multiplexed optical signals of different wavelengths. The transmitting device 90 multiplexes multiple input optical signals and sends the resulting signal light S to the receiving device 91 over the transmission line 80, 81. The receiving device 91 receives the signal light S from the transmitting device 90 over the transmission line 80, 81, splits the signal light S into optical signals of individual wavelengths, and outputs the optical signals. While the present example illustrates transmission apparatuses 9a and 9b provided at two nodes in a communications network, the entire communications network may be configured by multiple nodes connected in a ring topology, for example.

The transmitting device 90 includes a transmitting unit 2, a control unit 30, couplers 31 and 32, an optical supervisory channel (OSC) transmitter 33, and a photodetector 34. The transmitting unit 2 sends signal light S to the external receiving device 91 over the transmission line 80, 81. The transmitting unit 2 includes multiple main signal transmitters 20, a multiplexer 21, an amplifier 22, and a variable optical attenuator (VOA) 23.

The main signal transmitters 20 output multiple optical signals $\lambda 1, \lambda 2 \ldots$ of different wavelengths to the multiplexer 21. The main signal transmitters 20, which are transponders for example, modulate data signals input from an external communication device into optical signals $\lambda 1, \lambda 2 \ldots$ of predetermined wavelengths and output them.

The multiplexer 21 is a wavelength multiplexer for example, and generates a wavelength-multiplexed optical signal by multiplexing multiple optical signals $\lambda 1, \lambda 2 \ldots$. The generated wavelength-multiplexed optical signal is amplified by the amplifier 22, which is a post-amplifier, and output to the variable optical attenuator 23. The variable optical attenuator 23 attenuates the wavelength-multiplexed optical signal by an amount of attenuation indicated by a control signal C input from the control unit 30. In addition to the optical signals $\lambda 1, \lambda 2 \ldots$, other wavelength-multiplexed optical signals received from transmission apparatuses of other nodes may be input to the multiplexer 21.

The wavelength-multiplexed optical signal attenuated by the variable optical attenuator 23 is demultiplexed by one coupler 31 and guided to the other coupler 32 and the photodetector 34. The wavelength-multiplexed optical signal is combined by the coupler 32 with a monitoring optical signal $\lambda 0$ input from the OSC transmitter 33, and guided to the transmission line 80, 81 as signal light S. The monitoring optical signal $\lambda 0$ has a wavelength different from that of the optical signals $\lambda 1, \lambda 2 \ldots$ output from the main signal transmitters 20 and delivers monitoring control information between the transmission apparatuses 9a and 9b.

The OSC transmitter 33 generates monitoring optical signal $\lambda 0$ based on monitoring control information input from the control unit 30 and sends the monitoring optical signal $\lambda 0$ to the external receiving device 91 over the transmission line 80, 81. The monitoring control information contains information on the state of the transmission apparatuses 9a and 9b as well as the value of reception level of signal light S received from the other transmission apparatus 9a, 9b as discussed later. The monitoring control information transmitted by the OSC transmitter 33 is used for various kinds of control by the control unit 30 on the transmission apparatus 9a, 9b which receives the monitoring control information.

The photodetector 34 detects the light intensity, or transmission level, of the input wavelength-multiplexed optical signal that has been demultiplexed by the coupler 31, and outputs the light intensity as an electric detection signal to the control unit 30. The photodetector 34 may be photodiode, for example.

The control unit 30 is a central processing unit (CPU) and/or an arithmetic processing circuit, for example. The control unit 30 controls the transmission level of signal light S based on the transmission level detected by the photodetector 34 and the reception level derived from monitoring light $\lambda 0$ sent by the transmission apparatus 9a, 9b on the other end. Control of transmission level is achieved by calculating transmission line loss from the difference between transmission level and reception level and adjusting the amount of attenuation to be applied by the variable optical attenuator 23 with control signal C so as to compensate for (or reduce) variations in the transmission line loss. The control unit 30 also generates the monitoring control information mentioned above and outputs it to the OSC transmitter 33.

The receiving device 91 includes a receiving section 4, couplers 51 and 52, an OSC receiver 53, and a photodetector 54. The receiving section 4 receives signal light S from the external transmitting device 90 over the transmission line 80, 81. The receiving section 4 includes multiple main signal receivers 40, a demultiplexer 41, and an amplifier 42.

Signal light S passes through the couplers 51 and 52 to be input to the optical amplifier 42, which is a pre-amplifier. The optical amplifier 42 amplifies the signal light S and outputs it to the demultiplexer 41.

The demultiplexer 41, which is a wavelength demultiplexer for example, splits signal light S of the wavelength-multiplexed optical signal into optical signals $\lambda 1, \lambda 2 \ldots$ of individual wavelengths and outputs them respectively to the main signal receivers 40. The main signal receivers 40 are transponders for example and modulate optical signals $\lambda 1$, $\lambda 2 \ldots$ and output them to an external communication device as data signals. The demultiplexer 41 may transfer part of signal light S to transmission apparatuses of other nodes.

The coupler 51 demultiplexes the signal light S and guides it to the receiving section 4 and the photodetector 54. The photodetector 54, which is photodiode for example, detects the reception level of signal light S received by the receiving device 91 and outputs the reception level to the control unit 30 as an electric detection signal. The detected reception level is output by the control unit 30 to the OSC transmitter 33 as monitoring control information.

The coupler 52 demultiplexes signal light S and guides it to the other coupler 51 and the OSC receiver 53. The OSC receiver 53 receives monitoring optical signal $\lambda 0$ by extracting it from the signal light S by use of a wavelength filter or the like. The OSC receiver 53 outputs the monitoring control information superimposed on the monitoring optical signal λ0 to the control unit 30 of the transmitting device 90. Thereby, the reception level of signal light S detected on the external receiving device 91 is determined.

As described, the reception level of signal light S is indicated from one transmission apparatus 9a, 9b to the other transmission apparatus 9b, 9a as monitoring optical signal λ0. In other words, the reception level of signal light S transmitted on one transmission line 80, 81 is indicated to the sender by signal light S in the opposite direction sent on the other transmission line 81, 80.

As mentioned above, the control unit 30 calculates loss on the transmission lines 80 and 81 based on the reception level derived from monitoring optical signal λ0 and the transmission level detected by the photodetector 34. The control unit 30 then adjusts the amount of attenuation to be applied by the variable optical attenuator 23 based on the calculated transmission line loss, thereby controlling the transmission level of signal light S.

For example, when the transmission level is 0 dB and the reception level is −10 dB, the transmission line loss, which is the difference between the transmission level and the reception level, is 10 dB. Assuming then that the dynamic range of the optical amplifier 42 is −20 to −15 dB, the control unit 30 adjusts the amount of attenuation for the variable optical attenuator 23 at 6 to 9 dB so that the reception level falls within the dynamic range.

Since the transmission level of signal light S is dependent on the total of optical signal strengths of optical signals λ1, λ2 . . . , the transmission level varies with the number of main signal transmitters 20 included in the transmitting device 90 (that is, the number of optical signals λ1, λ2 . . . ). For example, when a main signal transmitter 20 for λ2 is added to a main signal transmitter 20 for λ1, the transmission level will increase by 3 dB.

As mentioned above, the control unit 30 obtains transmission level from its transmission apparatus 9a, 9b and obtains reception level from the other transmission apparatus 9b, 9a (to which signal light S is sent) over the transmission line 81, 80. There is therefore at least a difference equivalent to delay on the transmission lines 80 and 81 between the timings of detecting transmission level and reception level which are used for calculating transmission line loss.

Thus, when a change occurs in transmission level, it is recognized as a temporary variation of transmission line loss because the reception level used for calculation of transmission line loss has not reflected the change in transmission level. For example, when the transmission level increases by 3 dB, the control unit 30 recognizes that a variation of 3 dB has occurred in transmission line loss.

The control unit 30 accordingly delays control of transmission level so that a calculated transmission line loss is not reflected into transmission level until the reception level value is updated. For example, adjustment time for the variable optical attenuator 23 equivalent to 0.1 dB is set to about 10 msec.

As a result, the reception level value is updated before transmission level reaches a value dependent on the calculated transmission line loss, so the transmission level is maintained within a range that keeps reception errors from occurring. When an actual variation occurs in transmission line loss, the reception level remains lowered. The transmission level therefore becomes a value dependent on the transmission line loss over time, which makes distinction from a case of transmission level variation.

As described, the communication system of this example is capable of reducing influence of change in the transmission level of signal light S associated with increase or decrease in the number of main signal transmitters 20 and controlling the transmission level responsive to variations in transmission line loss. Due to control delay, however, the communication system does not allow for rapid control in response to a sudden variation in transmission lines.

Figure 2:
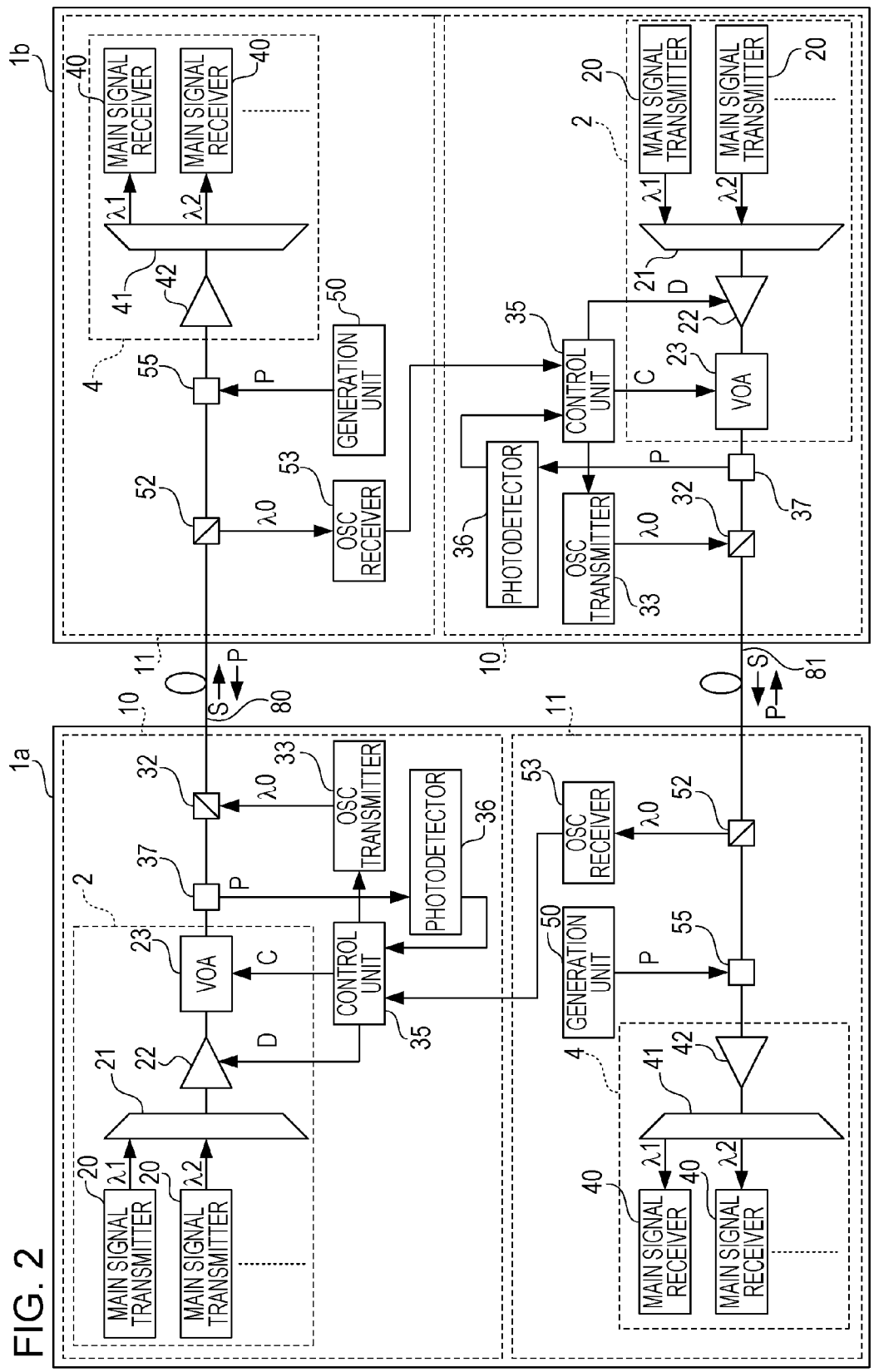
FIG. 2 illustrates the configuration of a communication system according to an embodiment of the present disclosure.

FIG. 2 illustrates the configuration of a communication system according to an embodiment of the present disclosure. In FIG. 2, elements common to the above-described comparative example are denoted with the same reference characters and their descriptions are omitted.

The transmission apparatuses 1a and 1b each include a transmitting device 10 and a receiving device 11. The transmitting device 10 and the receiving device 11 of one transmission apparatus is are respectively connected with the receiving device 11 and the transmitting device 10 of the other transmission apparatus 1b over separate transmission lines 80 and 81.

In this embodiment, the transmitting device 10 sends signal light S to the receiving device 11 over the transmission line 80, 81, and the transmission level of signal light S is controlled in accordance with the reception level of probe light P, which is transmitted from the receiving device 11 to the transmitting device 10 over the transmission line 80, 81. That is, the transmission level of signal light S transmitted over the transmission line 80, 81 is controlled in response to the reception level of probe light P which is transmitted on the same transmission line 80, 81 in the opposite direction. Specific configurations will be described below.

The transmitting device 10 includes a transmitting unit 2, a control unit 35, a coupler 32, a light guiding unit 37, an OSC transmitter 33, and a photodetector 36. The transmitting unit 2 sends signal light S to the external receiving device 11 over the transmission line 80, 81, as in the comparative example.

The receiving device 11 includes a receiving section 4, a coupler 52, a light guiding unit 55, an OSC receiver 53, and a generation unit 50. The receiving section 4 receives signal light S from the external transmitting device 10 over the transmission line 80, 81, as in the comparative example. The receiving device 11 also sends probe light P to the transmitting device 10 on the other end over the transmission line 80, 81.

Figure 3:
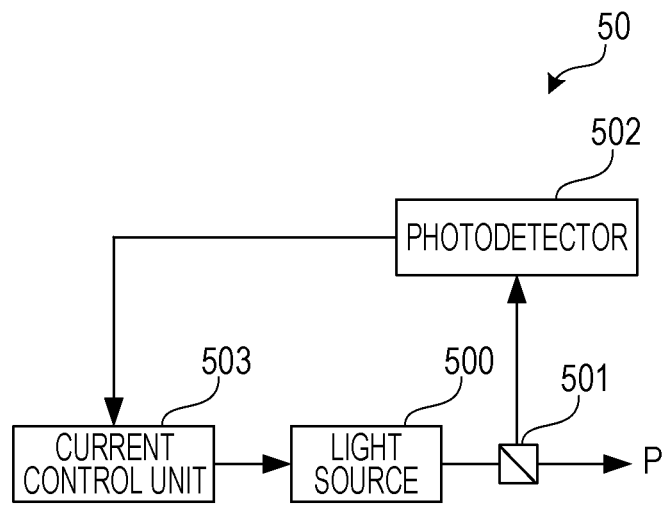
FIG. 3 illustrates an exemplary configuration of a probe light generating unit.

The generation unit 50 generates probe light P and outputs it to the light guiding unit 55. FIG. 3 illustrates an exemplary configuration of the generation unit 50. The generation unit 50 includes a light source 500, a coupler 501, a photodetector 502, and a current control unit 503.

The light source 500 is formed of laser diode, for example, and outputs probe light P. The probe light P is unmodulated continuous wave (CW) having a single wavelength. Also, the wavelength of probe light P may be the same as the wavelength of signal light S (any one of λ1, λ2 . . . ) in order to avoid wavelength dependency in calculation of transmission line loss. The probe light P is demultiplexed by the coupler 501 to be guided to the photodetector 502 and the light guiding unit 55.

The photodetector 502 detects the transmission level of the input probe light P which has been demultiplexed by the coupler 501, and outputs the transmission level to the current control unit 503 as an electric detection signal. The photodetector 502 may be photodiode, for example.

The current control unit 503 detects variations in transmission level based on the transmission level detected by the photodetector 502, and controls an electric current to be output to the light source 500 so that the transmission level of probe light P is maintained at a predetermined value. When a variation occurs in the transmission level due to an external factor such as change in temperature, the current control unit 503 controls the electric current so as to compensate for (or reduce) the variation. As such automatic adjustment of light intensity (auto level control: ALC) is provided for the purpose of stabilizing the transmission level of probe light P, it may be provided as desired.

Figure 4:
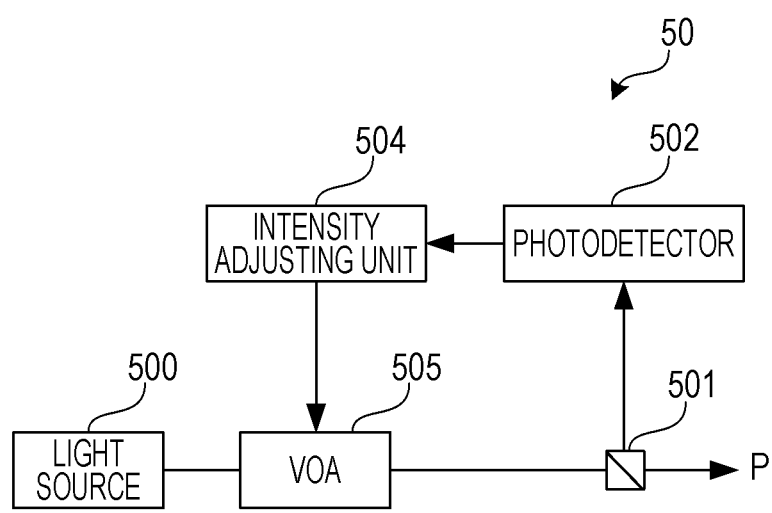
FIG. 4 illustrates another exemplary configuration of the probe light generating unit.

The implementation of ALC is not limited to direct control of the light source 500 as in this example, but indirect control may be employed as illustrated in FIG. 4. In FIG. 4, elements common to FIG. 3 are denoted with the same reference characters and their descriptions are omitted.

The generation unit 50 in this example includes a light source 500, a coupler 501, a photodetector 502, an intensity adjusting unit 504, and a variable optical attenuator (VOA) 505. The variable optical attenuator 505 is interposed between the light source 500 and the coupler 501, and its amount of attenuation is adjusted in accordance with control by the intensity adjusting unit 504.

The intensity adjusting unit 504 detects variations in transmission level based on the transmission level detected by the photodetector 502 and controls the amount of attenuation for the variable optical attenuator 505 so that the transmission level of probe light P is maintained at a predetermined value. The output of the light source 500 is thereby adjusted so as to compensate for (or reduce) variations and probe light P is output to the light guiding unit 55 at a fixed transmission level as in the example of FIG. 3. The light output of the light source 500 may be adjusted through voltage control instead of current control.

Referring back to FIG. 2, the light guiding unit 55 is interposed between the receiving section 4 and the transmission line 80, 81, guiding signal light S input from the transmitting device 10 over the transmission line 80, 81 to the receiving section 4 and guiding probe light P generated by the generation unit 50 to the transmission line 80, 81. The light guiding unit 55 may be an optical device such as a coupler or an optical circulator, for example.

The probe light P guided to the transmission line 80, 81 is transmitted in the opposite direction to signal light S to be input to the transmitting device 10. On the transmitting device 10, the probe light P is input to the light guiding unit 37 via the coupler 32.

The light guiding unit 37 is interposed between the transmitting unit 2 and the transmission line 80, 81, guiding signal light S input from the transmitting unit 2 to the transmission line 80, 81 and separating probe light P input from the receiving device 11 over the transmission line 80, 81. The light guiding unit 37 may be an optical device such as a coupler or an optical circulator, for example.

Probe light P is guided to the photodetector 36 by the light guiding unit 37. The photodetector 36 detects the reception level of probe light P input from the light guiding unit 37 and outputs the reception level to the control unit 30 as an electric detection signal. The photodetector 36 may be photodiode, for example.

The control unit 35 controls the transmission level of signal light S in accordance with the reception level of probe light P separated by the light guiding unit 37. The control unit 35, which is an arithmetic processing circuit such as a CPU, calculates transmission line loss from the difference between the transmission level and the reception level maintaining the transmission level of probe light P at a predetermined value, that is, a known value. The control unit 35 then controls the amount of attenuation for the variable optical attenuator 23 with control signal C so as to compensate for (or reduce) variations in transmission line loss.

As described, the transmitting device 10 in this example receives probe light P separately from signal light S, which is the subject of transmission over the transmission line 80, 81, from the receiving device 11 to which the signal light S is sent, via the same transmission line 80, 81 and the light guiding unit 37. The transmitting device 10 then controls the transmission level of signal light S responsive to the reception level of probe light P. The transmitting device 10 thus may calculate transmission line loss with accuracy without being affected by change in the transmission level of signal light S and compensate for (or reduce) variations in transmission line loss.

The control unit 35 therefore does not have to delay control and may control transmission level in quick response to a sudden variation in transmission line loss. Since the only factor delaying control in this embodiment is transmission line delay of probe light P, given that the length of the transmission lines 80 and 81 is 50 km for example, the delay is 0.25 msec, which is smaller than 10 msec in the comparative example.

The control unit 35 may also stop transmission of signal light S while probe light P is not received. More specifically, the control unit 35 determines whether probe light P is being received or not based on the detection signal from the photodetector 36. If probe light P is not being received, the control unit 35 stops output of the amplifier 22 with control signal D with the assumption that there is a transmission line failure. By the control unit 35 executing auto power shut down (APSD) function in this way, recovery works from the failure may be performed with increased safety.

Also, in the above-described comparative example, the value of reception level of signal light S transmitted over one transmission line 80, 81 is indicated to the sender over the other transmission line 81, 80. For this reason, when a failure occurs on one of the transmission lines 81 and 80, it becomes no longer possible to detect failures on the other one of the transmission lines 80 and 81. In this embodiment, in contrast, probe light P is transmitted separately on the transmission lines 80 and 81, failures on the transmission lines 80 and 81 may be independently detected and APSD function may be executed even when failures occur on both the transmission lines 80 and 81.

Figure 5:
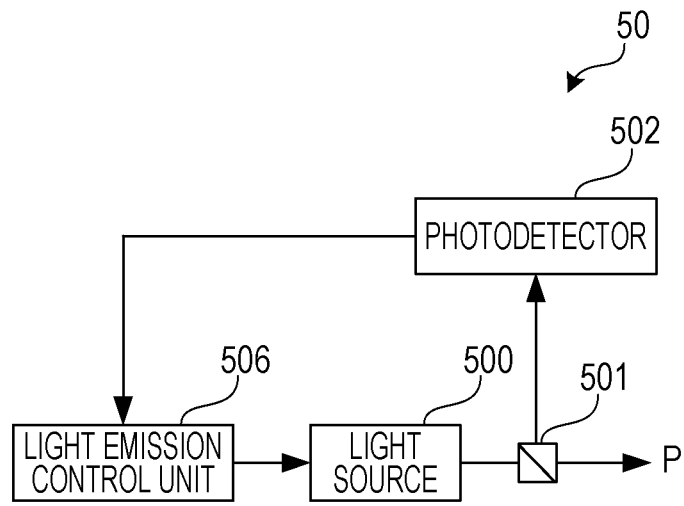
FIG. 5 illustrates still another exemplary configuration of the probe light generating unit.

While the control unit 35 of this embodiment calculates transmission line loss maintaining the transmission level of probe light P at a predetermined value, it is also possible to superimpose information about transmission level on probe light P by modulation and use the information derived from probe light P to calculate transmission line loss. FIG. 5 illustrates an exemplary configuration of the generation unit 50 for that case. In FIG. 5, elements common to FIG. 3 are denoted with the same reference characters and their descriptions are omitted.

The generation unit 50 includes a light source 500, a coupler 501, a photodetector 502, and a light emission control unit 506. The light emission control unit 506 obtains the transmission level of probe light P from the photodetector 502 and controls the light emission of the light source 500 for superimposing level information indicating the transmission level onto probe light P. More specifically, the light emission control unit 506 applies intensity modulation to probe light P by on-off controlling the driving current for the light source 500 in accordance with the level information.

The level information may be sent with a predetermined data pattern, for example, so that the level information may be easily recognized by the control unit 35 of the transmitting device 10. In this case, the light emission control unit 506 superimposes the data pattern and level information on probe light P.

In FIG. 2, the control unit 35 takes level information from probe light P and controls the transmission level of signal light S in accordance with the level information and reception level. Specifically, the control unit 35 extracts level information from the detection signal produced by the photodetector 36, obtains reception level, and calculates transmission line loss from the difference between the value of the level information and the reception level. In a case where the predetermined data pattern is superimposed on probe light P, the control unit 35 recognizes level information by detecting the data pattern.

As described above, in the communication system of this example, the generation unit 50 superimposes level information indicative of transmission level on probe light P by modulation, allowing the control unit 35 to calculate transmission line loss with accuracy without being affected by change in the transmission level of probe light P. This example thus does not employ the ALC function, which was illustrated in FIGS. 3 and 5.

Figure 6:
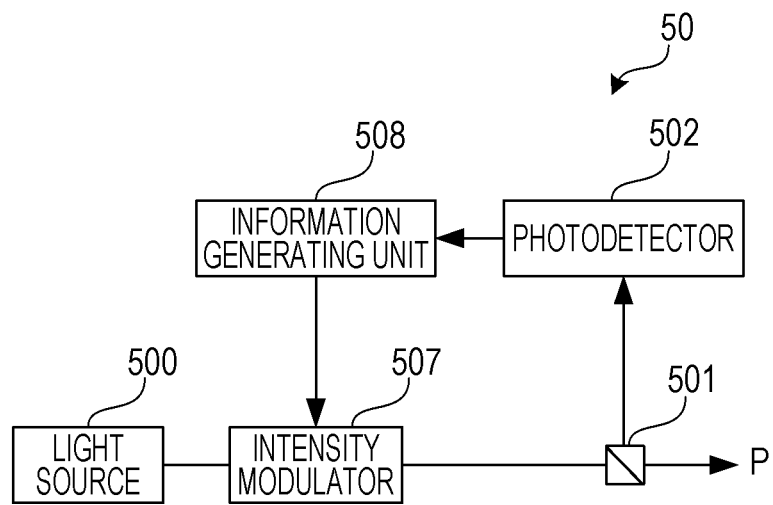
FIG. 6 illustrates yet another exemplary configuration of the probe light generating unit.

While the exemplary configuration represented in FIG. 5 employs direct modulation to directly turn on and off the driving current for the light source 500, this is not limitation; external modulation may be used to control the output light of the light source 500 with an external signal. FIG. 6 illustrates an exemplary configuration of the generation unit 50 for employing external modulation. In FIG. 6, elements common to FIG. 3 are denoted with the same reference characters and their descriptions are omitted.

The generation unit 50 includes a light source 500, a coupler 501, a photodetector 502, an information generating unit 508, and an intensity modulator 507. The intensity modulator 507 is interposed between the light source 500 and the coupler 501. The intensity modulator 507 is formed of dielectric material with electro-optic effect, such as lithium niobate ($LiNbO_3$) for example, and applies intensity modulation to the output light of the light source 500 in accordance with an intensity control signal input from the information generating unit 508.

The information generating unit 508 generates level information indicating transmission level based on the detection signal from the photodetector 502 and outputs the level information to the intensity modulator 507 as an intensity control signal. Thereby the output light of the light source 500 is modulated in intensity and level information is superimposed.

This example provides similar effects to the configuration of FIG. 5 since the control unit 35 may derive the transmission level from probe light P as in the example of FIG. 5. The way of superimposing level information on probe light P is not limited to intensity modulation as in this example, but phase modulation such as phase shift keying (PSK) may be adopted.

While the present disclosure has been described specifically with reference to a preferred embodiment thereof, it will be apparent to those skilled in the art that various modifications may be made on the basis of the fundamental technical principle and teachings of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmitting device, comprising:
   a transmitter configured to transmit signal light to an external receiver over a medium included in a transmission line; and
   a controller configured to
      receive a probe light which is input from the external receiver over the medium in the transmission line in an opposite direction of the signal light, the probe light being unmodulated;
      calculate a transmission loss in the medium included in the transmission line based on a difference of a transmission level of the signal light and a reception level of the probe light; and
      control the transmission level of the signal light by compensating for variations of transmission line loss in the medium included in the transmission line based on the calculated transmission loss.

2. The transmitting device according to claim 1, further comprising:
   a light guiding unit that is interposed between the transmitter and the transmission line, guides the signal light input from the transmitter to the transmission line, and separates the probe light which is input from the receiver over the transmission line;
   wherein the controller controls the transmission level of the signal light in accordance with the reception level of the probe light separated by the light guiding unit.

3. The transmitting device according to claim 1, wherein the probe light has a single wavelength.

4. The transmitting device according to claim 1, wherein the wavelength of the probe light is identical with the wavelength of the signal light.

5. The transmitting device according to claim 1, wherein the controller performs control for stopping transmission of the signal light when the probe light is not received.

6. A communication system, comprising:
   a transmitting device, including:
      a transmitter configured to transmit signal light to an external receiver over a medium included in a transmission line, the external receiver demodulating the signal light into an electrical signal;
      a controller configured to
         receive a probe light which is input from the external receiver over the medium in the transmission line in an opposite direction of the signal light, the probe light being unmodulated,
         calculate a transmission loss in the medium included in the transmission line based on a difference of a transmission level of the signal light and a reception level of the probe light, and
         control the transmission level of the signal light by compensating for variations of transmission line loss in the medium included in the transmission line based on the calculated transmission loss; and
   a receiver that is connected with the transmitting device via a transmission line, wherein the receiver includes
      a receiving section configured to receive signal light from the transmitting device over the transmission line, a generator configured to generate the probe light, and a receiving-end light guiding unit, interposed between the receiving section and the transmission line, that guides to the receiving section the signal light input from the transmitting device over the transmission line, and guides the probe light generated by the generator to the transmission line.

7. The communication system according to claim 6, wherein the generator outputs the probe light at a fixed transmission level.

8. The communication system according to claim 2, wherein the probe light corresponding to the signal light is transmitted in a different direction than the signal light on the same optical fiber.

9. The communication system according to claim 6, wherein the generator superimposes level information indicating the transmission level of the probe light onto the probe light by modulation,
wherein the controller takes the level information from the probe light, and controls the transmission level of the signal light in accordance with the level information and the reception level.

10. A method for transmission level control, comprising:
transmitting signal light to an external receiver over a medium included in a transmission line from a transmitter;
receiving a probe light which is input from the external receiver over the medium in the transmission line in an opposite direction of the signal light, the probe light being unmodulated;
calculating a transmission loss in the medium included in the transmission line based on a difference of a transmission level of the signal light and a reception level of the probe light; and
controlling the transmission level of the signal light by compensating for variations of transmission line loss in the medium included in the transmission line based on the calculated transmission loss.

11. The method for transmission level control according to claim 10, wherein the probe light has a single wavelength.

12. The method for transmission level control according to claim 10, wherein the wavelength of the probe light is identical with the wavelength of the signal light.

13. The method for transmission level control according to claim 10, wherein transmission of the signal light is stopped when the probe light is not received.

14. The method for transmission level control according to claim 10, wherein the probe light is transmitted at a fixed transmission level.

15. The method for transmission level control according to claim 10,
wherein level information indicating the transmission level of the probe light is superimposed on the probe light by modulation,
wherein the transmission level of the signal light is controlled in accordance with the level information taken from the probe light and the reception level.

16. A transmitting device, comprising:
a transmitter configured to transmit signal light to an external receiver through an optical fiber included in a transmission line; and
a controller configured to
receive a probe light which is input from the receiver through the same optical fiber in the transmission line in an opposite direction of the signal light;
calculate a transmission loss in a medium included in the transmission line based on a difference of a transmission level of the signal light and a reception level of the probe light; and
control the transmission level of the signal light by compensating for variations of transmission line loss in the medium included in the transmission line based on the calculated transmission loss.

* * * * *